UNITED STATES PATENT OFFICE.

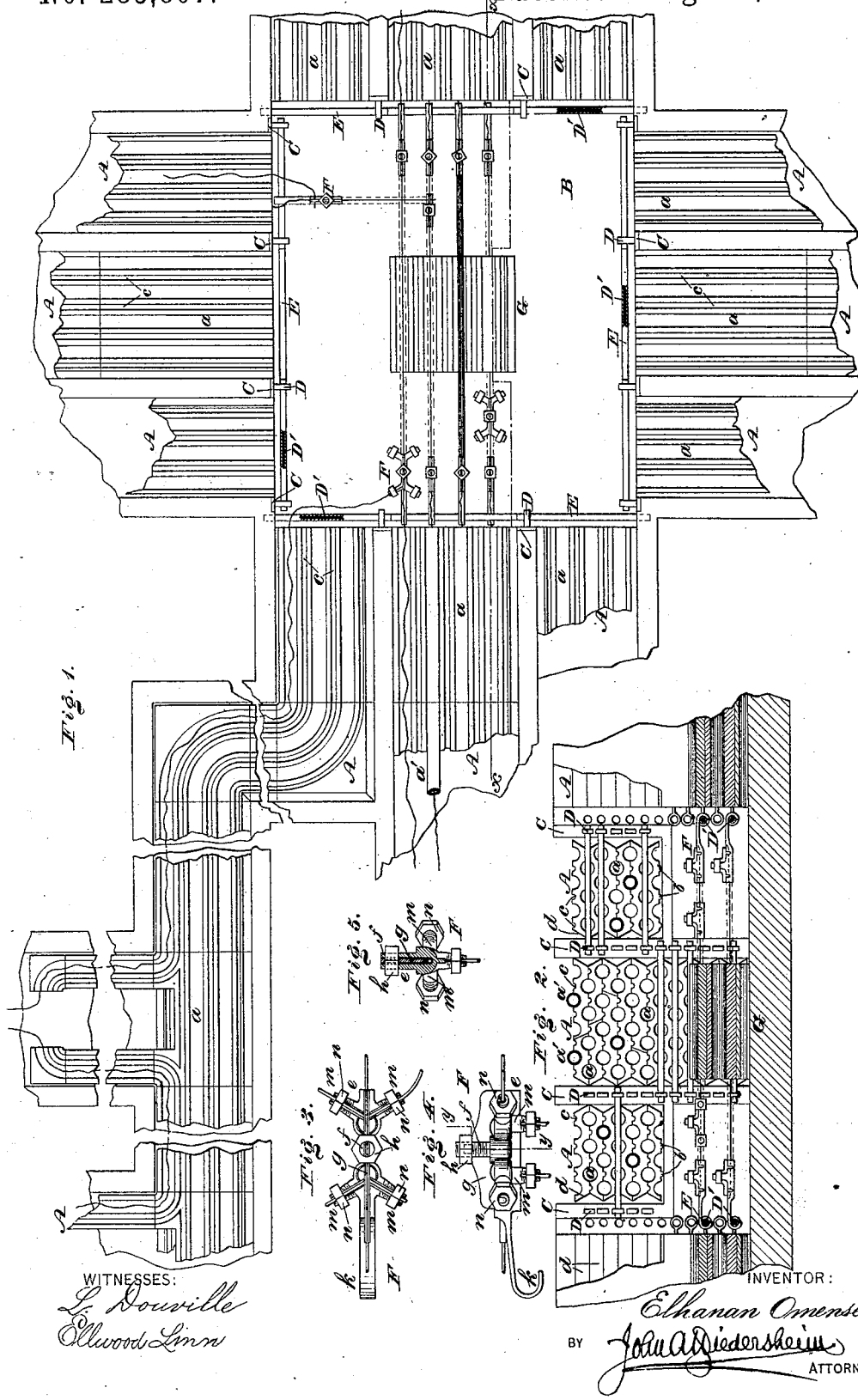

ELHANAN OMENSETTER, OF PHILADELPHIA, PENNSYLVANIA.

UNDERGROUND CONDUIT FOR ELECTRIC WIRES.

SPECIFICATION forming part of Letters Patent No. 283,807, dated August 28, 1883.

Application filed June 5, 1883. (No model.)

*To all whom it may concern:*

Be it known that I, ELHANAN OMENSETTER, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 is a top or plan view of an underground conduit for electric wires embodying my invention, the same being uncovered. Fig. 2 is a partial end view and partial vertical section thereof, the section being in line $xx$, Fig. 1. Fig. 3 is a top view of a detached part enlarged. Fig. 4 is a side elevation of the portion shown in Fig. 3. Fig. 5 is a vertical section thereof in line $yy$, Fig. 4.

Similar letters of reference indicate corresponding parts in the several figures.

My invention consists of an underground conduit for electric wires, formed of channeled or grooved plates adapted to be interlocked, the wires being laid in the channels or grooves and insulated therein.

It also consists of a vault and means for sustaining the wires therein.

Referring to the drawings, A represents matched plates of glass, terra-cotta, or other suitable material, which are grooved or corrugated on opposite faces, so that when they are placed one on the other the grooves or corrugations coincide and form channels $a$, for the reception and passage of electric wires, the latter being inclosed in glass tubing $a'$, or other proper insulators. The plates are located within an inclosure of masonry or other suitable material in the ground along the route of the line, with suitable turn-outs, branches, &c. The faces of the plates are also formed with tongues and grooves $b\ c$, so disposed that the tongues and grooves of opposite plates are adapted to engage, and thus interlock the plates, they being suitably cemented, it being noticed that the channels $a$ alternate on opposite sides of each matched plate, so that the parts between the channels are adapted to have the tongues and grooves $b\ c$ alternate, respectively, with said channels $a$, and thus interlock the adjacent plates throughout the width of the same, the channels $a$ on opposite sides avoiding the formation of thick plates. The alternate arrangement of the channels is an advantage, but not a necessary part of the invention. The sides of the plates are beveled or oblique, as at $d$, so that when two plates are placed together the beveled faces or edges are in contact, they coincide or match, thus interlocking said faces, and the plates are furthermore of different lengths, so as to break joints, thus preventing leakage through the series of superimposed plates. Where the beveled faces of the plates are at the sides of the inclosure, they leave spaces thereat for the purposes of ventilation or condensation.

The channels $a$, or the tubing therein, may be coated with gum-shellac or other insulating material, and when the conduit is built up of the desired number of plates the top thereof is covered with asbestus paper prepared with shellac, above which is a layer of brick, stone, or cement and filling, and the paving on the surface of the street, it being seen that the plates as interlocked are prevented from shifting, and a serviceable, durable conduit is produced.

B represents a station or vault for testing the wires, repairs, &c., the same being made of brick or other material, and having fixed on the inner sides thereof metallic frames C, which are provided with staples or eyes D, for the support of rods or pipes D', which are inclosed in glass or insulated tubing E. Attached to the rods are holders F, for the wires passing through the station, whereby said wires may be properly stretched, tightened, and sustained. Each holder consists of a grooved block, $e$, (see Fig. 5,) in which the wire is laid, a bolt, $f$, divided vertically, a clamp, $g$, which is passed through the divisions of the bolt and rested on the wire, a nut, $h$, which engages with the bolt $f$ and tightens against the clamp for compressing the latter on the wire, and a hooked or bent arm, $k$, which is adapted to be fitted on the rod or pipe D', it being seen that when the clamp is compressed the wire is firmly held. In order to prevent movement of the clamp, the upper portion is formed with a tongue or shoulder, which occupies a position within the divided bolt, so as to be embraced by the nut $h$, whereby the clamp is doubly held in position. The wires within the station are protected by a covering of asbestus paper cemented with gum-shellac and coated with similar gum, the ends of the covering or tubing being cemented with the plates in the channels or tubes thereof.

For crossings, turn-outs, &c., the holder is formed with split branches $m$, through which the side or turn-out wires are passed, said branches being of tapering form, so that when corresponding nuts, $n$, are fitted thereto the sections of the branches are brought together and compressed against the wires, the clamp $g$ being also forced against all of the main and side or turn-out wires by the action of the nut $h$, whereby the several wires are firmly and securely held, it being evident that the said wires are properly connected.

For the purpose of supporting the wires at the center of the station, I form a pier, G, on the floor or foundation thereof, the same being constructed of plates similar to the plates A, thus preventing sagging of the wires.

Having thus described my invention, what I claim as new, and desire to secure by Letters Patent, is—

1. Plates having wire-receiving channels and formed with oblique sides adapted to fit together, substantially as and for the purpose set forth.

2. A pile of channeled matched plates, forming tubes, fitted together with tongues and grooves, having a top covering of shellaced asbestus paper, substantially as and for the purpose set forth.

3. An underground station or vault provided with staples or eyes D and rods or pipes supported thereon for the support of wire-holders, substantially as and for the purpose set forth.

4. A wire-holder formed of a grooved block, $e$, a clamp, $g$, a bolt, $f$, a nut, $h$, and an attaching-arm, $k$, substantially as and for the purpose set forth.

5. The wire-holder F, constructed substantially as described, having split branches $m$, of tapering form, and tapering nuts $n$, as set forth.

6. Matched plates, in combination with the station or vault, and a pier within the same, formed of horizontal matched plates piled one upon another, substantially as and for the purpose set forth.

7. The combination, with the wires, of a sheathing formed of asbestus paper and gum-shellac and a sub-coating of similar gum, substantially as and for the purpose set forth.

ELHANAN OMENSETTER.

Witnesses:
  JOHN A. WIEDERSHEIM,
  A. P. GRANT.